United States Patent
Weihrauch

(10) Patent No.: US 7,265,515 B2
(45) Date of Patent: Sep. 4, 2007

(54) STARTER FOR A LINE START ELECTRIC MOTOR

(75) Inventor: Niels Christian Weihrauch, Flensburg (DE)

(73) Assignee: Danfoss Compressors GmbH, Flensburg (DE)

( * ) Notice: Subject to any disclaimer, the term of this patent is extended or adjusted under 35 U.S.C. 154(b) by 226 days.

(21) Appl. No.: 11/046,102

(22) Filed: Jan. 28, 2005

(65) Prior Publication Data
US 2005/0168188 A1   Aug. 4, 2005

(30) Foreign Application Priority Data
Jan. 30, 2004 (DK) ............... 2004 00137
Jan. 30, 2004 (DK) ............... 2004 00138
Apr. 10, 2004 (DE) ......... 10 2004 017 624

(51) Int. Cl.
*H02P 1/42* (2006.01)

(52) U.S. Cl. ............ 318/792; 318/778; 318/783; 318/782; 318/430; 318/431

(58) Field of Classification Search ........... 318/791, 318/778, 783, 782, 430, 471, 443, 472, 473; 361/22
See application file for complete search history.

(56) References Cited

U.S. PATENT DOCUMENTS

| 3,737,752 A * | 6/1973 | Strachan ............ 318/471 |
| 6,356,047 B1 | 3/2002 | Cecconi ............ 318/791 |
| 6,456,470 B1 * | 9/2002 | Cecconi ............ 361/22 |
| 2002/0190595 A1 | 12/2002 | Han et al. ............ 310/156.53 |

\* cited by examiner

*Primary Examiner*—Karen Masih
(74) *Attorney, Agent, or Firm*—McCormick, Paulding & Huber LLP

(57) ABSTRACT

The invention concerns a starter for a line start electric motor having at least one main winding (4) and at least one start winding (12) and which start winding is connected in series with a run capacitor (14) with which a start capacitor (17) and a PTC-thermistor (19) are connected in parallel. In order to make a simply constructed starter for a line start electric motor the start capacitor (17) and the PTC-thermistor (19) are connected in series with a switch mechanism (20). The series connected circuit made up of the start capacitor (17), the PTC-thermistor (19) and the switch mechanism (20) is connected in parallel with the run capacitor (14).

15 Claims, 1 Drawing Sheet

STARTER FOR A LINE START ELECTRIC MOTOR

CROSS-REFERENCE TO RELATED APPLICATION

Applicant hereby claims foreign priority benefits under U.S.C. § 119 from Danish Patent Application No. PA 2004 00137 filed on Jan. 30, 2004; Danish Patent Application No. PA 2004 00138 filed on Jan. 30, 2004; and German Patent Application No. 10 2004 017 624.8, filed on Apr. 10, 2004, the contents of which are incorporated by reference herein.

FIELD OF THE INVENTION

The invention concerns a starter for a line start electric motor.

BACKGROUND OF THE INVENTION

From US patent application US 2002/0190595 A1, a line start electric motor is known wherein a start capacitor and a PTC-thermistor are connected in parallel with a run capacitor and in series with a start winding. The PTC-thermistor serves to separate the voltage source from the start capacitor when the line start electric motor reaches a given rotational speed. In the patent application it is mentioned that the PTC-thermistor can be replaced by a centrifugal force switch. Such a centrifugal force switch requires a relatively high construction expense. Moreover, the movable parts of the centrifugal force switch must be lubricated in operation in order to assure a disturbance-free continuous operation. The lubricating means can be injured by the electric contacts, for example, as a result of being burned by electric arcs.

From U.S. Pat. No. 6,356,047 B1, a starter for an electric motor is known in which a PTC-thermistor and a relay are connected in parallel with a run capacitor. When the motor is started, the relay closes and the PTC-thermistor is subjected to current flowing through it. During the initial motor rotations, the PTC-thermistor heats itself so that the current flow is reduced. When the motor has reached the desired rotational speed, the relay is opened again. The circuitry known from the American patent is not suited for a line start electric motor, since no start capacitor is provided.

SUMMARY OF THE INVENTION

The object of the invention is to provide a simply constructed starter for a line start electric motor having at least one main winding and at least one start winding, which start winding is connected in series with a run capacitor and with which run capacitor a start capacitor and a PTC-thermistor are connected in parallel. A further object of the invention is to provide an optimum method for the control of the previously described starter. A further object of the invention is to make a line start electric motor with a simply constructed starter whereby the line start motor has at least one main winding and at least one start winding, which start winding is connected in series with a run capacitor and with which run capacitor a start capacitor and a PTC-thermistor are connected in parallel.

In the case of a line start electric motor having a main winding and at least one start winding and which start winding is connected in a series with a run capacitor and to which run capacitor, a start capacitor and a PTC-thermistor (cold conductor) is connected in parallel, the object is solved in that the start condenser and the PTC-thermistor are connected in series with a switch mechanism with the series connected circuit of a start capacitor, a PTC-thermistor and a switch mechanism being connected in parallel with the run capacitor. The start capacitor therefore sees to it that the line start electric motor starts and is synchronized. After the starting, the run capacitor takes care of the optimal running of the line start electric motor. Upon the starting of the line start electric motor the switch arrangement can be open or closed. If the switch arrangement upon the starting of the line start electric motor is open and as a requirement of the circuitry is first closed for example after a few milliseconds, then different voltage levels will lie on the run capacitor and on the start capacitor. The different voltage levels could lead to short circuits between the run capacitor and the start capacitor, which could damage the switch mechanism. These short circuits which appear upon the switching on of the start capacitor are limited by the PTC-thermistor. The PTC (positive temperature coefficient)-thermistor has a resistance which increases with increasing temperature. The PTC-thermistor therefore sees to it that the current to the start condenser is limited when the line start electric motor nears its operating rotational speed. Of course the PTC-thermistor even then absorbs some power when the operating rotational speed of the line start motor is reached. The switch mechanism then makes it possible to switch off the PTC-thermistor when the line start electric motor has reached its operating rotational speed.

A preferred exemplary embodiment of the starter is characterized in that the switch mechanism is formed by a current relay. In particular the switch mechanism involves a current relay which is open in its unexcited condition and which closes as soon as current is supplied to it.

A further preferred exemplary embodiment of the starter is characterized in that the PTC-thermistor is connected between the start capacitor and the switch mechanism. The switch mechanism assures that the start capacitor can be connected in parallel with the run capacitor. Moreover, the switch mechanism assures that the PTC-thermistor and the start capacitor can be switched off.

A further preferred exemplary embodiment of the starter is characterized in that the start capacitor is connected between the PTC-thermistor and the switch mechanism. The switch mechanism assures that the start capacitor can be connected in parallel to the run capacitor. Moreover, the switch mechanism assures that the PTC-thermistor and the start capacitor can be turned off.

A further preferred exemplary embodiment of the starter is characterized in that the switch arrangement is connected between the PTC-thermistor and the start capacitor. The switch mechanism assures that the start capacitor can be connected parallel to the run capacitor. Moreover, the switch mechanism assures that the PTC-thermistor and the start capacitor can be turned off.

A further preferred exemplary embodiment of the starter is characterized in that the start capacitor, the PTC-thermistor and the switch mechanism are connected in series with the start winding. The start capacitor upon starting of the line start electric motor delivers current to the start winding.

A further preferred exemplary embodiment of the starter is characterized in that the switch mechanism is mechanically actuated. The switch mechanism can, for example, comprise a centrifugal force switch, which is connected in series with the PTC-thermistor and the start capacitor.

A further preferred exemplary embodiment of the starter is characterized in that the switch mechanism is electrically actuated. The switch mechanism can, for example, be formed by a relay which is actuated by a control signal dependent on time, voltage or current.

The object in the case of a method for controlling a previously described starter is thereby solved in that the switch mechanism is controlled in dependence on time. The optimum switching time point can be experimentally determined.

A preferred exemplary embodiment of the method is characterized in that the switch mechanism upon the starting of the line start electric motor is closed and is opened after the running of a pre-chosen time period. The pre-chosen time period, for example, amounts to about two seconds.

A further preferred exemplary embodiment of the method is characterized in that the switch mechanism is controlled in dependence on current. The current dependent control, in the framework of the present invention, has shown itself to be especially advantageous.

A further preferred exemplary embodiment of the method is characterized in that the switch arrangement upon the starting of the line start electric motor is open and closes after the running of a time period of for example 15 milliseconds. In the closed condition of the switch mechanism current flows through the switch mechanism, the start capacitor and the PTC-thermistor. Upon the starting of the line start electric motor the current level is relatively high with increasing rotational speed the current level falls. For the delayed closing of the switch mechanism a desired delay is not involved. For example, as the switch mechanism a current relay with an armature can be used, which armature is acted upon and pulled downwardly by gravity. In such a current relay the delay is produced in that the gravity force working on the armature must first be overcome before the switch mechanism, that is the current relay, closes.

A further preferred exemplary embodiment of the method is characterized in that the switch mechanism is opened as soon as a predetermined current level has been fallen below. When the line start electric motor comes near to its operating rotational speed, then the start capacitor and the PTC-thermistor are quasi turned off.

In case of a method for the control of a starter for a line start electric motor having at least one main winding and at least one start winding and which start winding is connected in series with a run capacitor, and with which run capacitor, a start capacitor and a switch mechanism are connected in parallel, the above given object is solved in that the switch mechanism upon the starting of the line start electric motor is open and is then first closed when the alternating current voltage across the run condenser has reached the level of the direct current voltage across the start capacitor. This has the advantage that a PTC-thermistor can be omitted.

In case of a line start electric motor having at least one main winding and at least one start winding and which start winding is connected in series with a run capacitor to which a start capacitor and a PTC-thermistor can be connected in parallel, the above given object is solved by a previously described starter which works especially according to the previously described method.

Further advantages, features and details of the invention will be apparent from the following description which with reference to the drawing describes different exemplary embodiments in detail. In connection with this, the features mentioned in the claims and in the description can be of inventive merit individually by themselves or in desired combination.

BRIEF DESCRIPTION OF THE DRAWINGS

The invention is described in the following by way of a preferred exemplary embodiment with reference to the drawing.

DETAILED DESCRIPTION OF THE PREFERRED EMBODIMENTS

Figure 1:
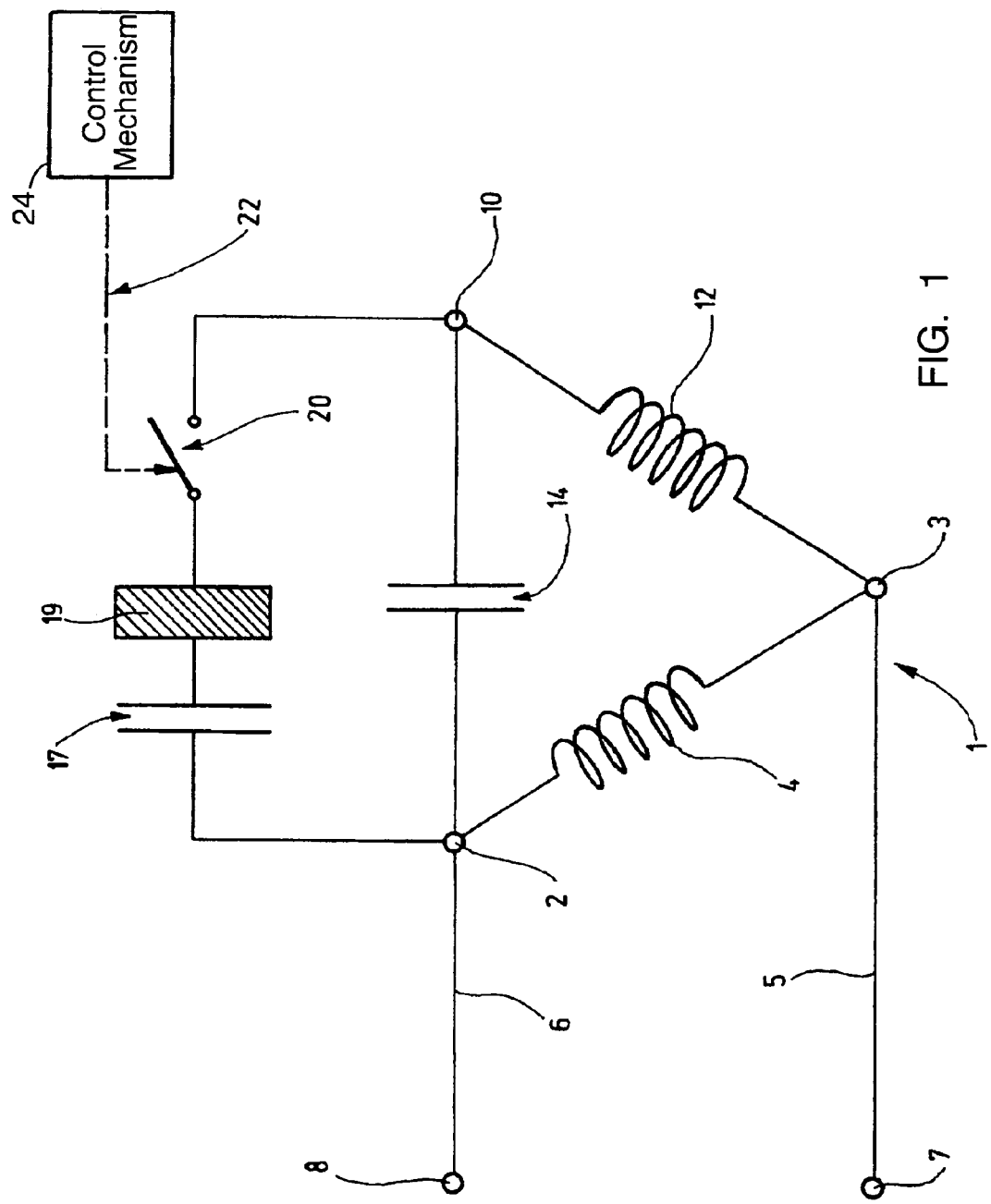
FIG. 1 shows the circuit of a line start electric motor (1) according to the invention.

The accompanying FIGURE shows the circuit of a line start electric motor (1) according to the invention. The line start electric motor (1) includes two conductor branch points (2) and (3) between which a drive winding (4) is arranged, and which is also designated as the main winding. The drive winding (4) is supplied with current through connecting conductors (5, 6) which by way of terminals (7, 8) stand connected to a voltage source. Between the conductor branch point (3) and a further conductor branch point (10) is arranged a start winding (12). The conductor branch points (2), (3) and (10) are arranged at the corners of an equilateral triangle. Between the conductor branch points (2) and (10) is arranged a run capacitor (14).

Proceeding from the conductor branch point (2) are a start capacitor (17), a PTC-thermistor (19) and a switch mechanism (20) are connected in series. The series circuit made up of the start capacitor (17), the PTC-thermistor (19) and the switch mechanism (20) is connected to the conductor branch points (2) and (10) and therefore in parallel with the run capacitor (14). By a broken line (22) it is indicated that the switch mechanism (20) can be actuated by a control mechanism (24). The switch mechanism (20) is preferably formed by a current dependent switch relay. The switch mechanism (20) can however also be actuated in dependence on time or voltage.

The line start motor (1) is by way of the terminals (7) and (8) connected to a (non-illustrated) voltage supply network. In the illustrated example the line start motor (1) includes a drive winding (4) and a start winding (12). The line start electric motor (1) can however also have more than one drive winding and more than one start winding. The run capacitor (14) is connected between the drive winding (4) and the start winding (12). The run capacitor (14) serves to suit the motor force to the workload. Upon the starting of the line start motor (1) the start capacitor (17) is connected by the switch (20) in parallel with the run capacitor (14). The start capacitor (17) causes the line start electric motor to start and to be synchronized. After the starting, the run capacitor provides for an optimal running of the line start electric motor. The capacitors (14) and (17) effect a phase shift of the current in the start winding (12) in relation to the current in the drive winding (4).

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A starter for a line start electric motor having at least one main winding and at least one start winding and which start winding is connected in series with a run capacitor with which a start capacitor and a PTC-thermistor are connected in parallel wherein the start capacitor and the PTC-thermistor are connected in series with a switch mechanism, with the series circuit comprising the start capacitor, the PTC-thermistor and the switch mechanism being connected in parallel with the run capacitor, wherein the switch mechanism is controlled in dependence on time.

2. The starter according to claim 1, wherein the switch mechanism is formed by a current relay.

3. The starter according to claim 1, wherein the PTC-thermistor is connected between the start capacitor and the switch mechanism.

4. The starter according to claim 1, wherein the start capacitor is connected between the PTC-thermistor and the switch mechanism.

5. The starter according to claim 1, wherein the switch mechanism is connected between the PTC-thermistor and the start capacitor.

6. The starter according to claim 1, wherein the start capacitor, the PTC-thermistor and the switch mechanism are connected in series with the start winding.

7. The starter according to claim 1, wherein the switch mechanism is mechanically actuatable.

8. The starter according to claim 1, wherein the switch mechanism is electrically actuatable.

9. The starter according to claim 1, wherein the switch mechanism is dosed upon the starting of the line start electric motor and is opened after the running of a predetermined time period.

10. The starter according to claim 1, wherein the switch mechanism is further controlled in dependence on current.

11. The starter according to claim 10, wherein the switch mechanism upon the starting of the line start electric motor is open and after the running of a time period, of for example 15 milliseconds, is closed.

12. The starter according to claim 11, wherein the switch mechanism opens as soon as a pre-given current level is fallen below.

13. The starter according to claim 1, wherein the switch mechanism upon the starting of the line start electric motor is open and after the running of a time period is closed.

14. A method for the control of a starter for a line start electric motor having at least one main winding and at least one start winding and which start winding is connected in series with a run capacitor with which a start capacitor and a switch mechanism is connected in parallel, wherein the switch mechanism upon the starting of the line start electric motor is open and is then first closed when the alternating current voltage across the run capacitor reaches the level, of the direct current voltage across the start capacitor.

15. A method for the control of a starter for a line start electric motor having at least one main winding and at least one start winding and which start winding is connected in series with a run capacitor with which a start capacitor and a switch mechanism is connected in parallel, wherein the switch mechanism upon the starting of the line start electric motor is closed and is then first opened after the running of a predetermined time period.

* * * * *